US010846678B2

(12) United States Patent
Patil et al.

(10) Patent No.: US 10,846,678 B2
(45) Date of Patent: Nov. 24, 2020

(54) SELF-SERVICE PRODUCT RETURN USING COMPUTER VISION AND ARTIFICIAL INTELLIGENCE

(71) Applicants: Amit R. Patil, Naperville, IL (US); Michael Paolella, Lake Zurich, IL (US); Michelangelo Palella, Bartlett, IL (US); Steve E. Trivelpiece, Rancho Santa Margarita, CA (US)

(72) Inventors: Amit R. Patil, Naperville, IL (US); Michael Paolella, Lake Zurich, IL (US); Michelangelo Palella, Bartlett, IL (US); Steve E. Trivelpiece, Rancho Santa Margarita, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 80 days.

(21) Appl. No.: 16/107,175

(22) Filed: Aug. 21, 2018

(65) Prior Publication Data

US 2020/0065791 A1    Feb. 27, 2020

(51) Int. Cl.

| G06K 15/00 | (2006.01) |
|---|---|
| G06Q 20/20 | (2012.01) |
| G06N 20/00 | (2019.01) |
| G06K 7/14 | (2006.01) |
| G06K 9/00 | (2006.01) |
| G06Q 20/40 | (2012.01) |
| G07F 7/06 | (2006.01) |

(52) U.S. Cl.
CPC ......... *G06Q 20/208* (2013.01); *G06K 7/1417* (2013.01); *G06K 9/00671* (2013.01); *G06N 20/00* (2019.01); *G06Q 20/206* (2013.01); *G06Q 20/407* (2013.01); *G07F 7/06* (2013.01)

(58) Field of Classification Search
CPC .. G06Q 20/208; G06Q 20/206; G06Q 20/407; G06N 20/00; G06K 7/1417; G06K 9/00671; G07F 7/06
USPC ........................................................ 235/383
See application file for complete search history.

(56) References Cited

U.S. PATENT DOCUMENTS

| 2004/0193438 A1* | 9/2004 | Stashluk, Jr. .......... G06Q 10/08 705/304 |
|---|---|---|
| 2004/0194056 A1* | 9/2004 | Combs ................. G06Q 30/016 717/104 |
| 2004/0245334 A1* | 12/2004 | Sikorski ............... G06F 1/1626 235/383 |
| 2014/0333761 A1* | 11/2014 | Porter ................... G06Q 30/06 348/135 |

* cited by examiner

*Primary Examiner* — Karl D Frech
(74) *Attorney, Agent, or Firm* — Arent Fox LLP

(57) ABSTRACT

Systems and methods for returning an item. The methods comprise: performing item return operations by a computing device using at least one of machine learned information about a person who purchased the item, machine learned information about a person returning the item, and machined learned information about a condition of the item at the time of sale and at the time of return; and automatively sorting the item using a conveyer system to move the item from a counter to a respective storage area of a plurality of storage areas assigned to different product types.

16 Claims, 6 Drawing Sheets

SELF-SERVICE PRODUCT RETURN USING COMPUTER VISION AND ARTIFICIAL INTELLIGENCE

BACKGROUND

Statement of the Technical Field

The present disclosure relates generally to computing systems. More particularly, the present disclosure relates to implementing systems and methods for self-service product return using computer vision and Artificial Intelligence ("AI").

DESCRIPTION OF THE RELATED ART

Today when you want to return an item to a retail store you need to find the receipt, take the item to the store, stand in a long line, and then explain why you are returning the product. This is a slow and inefficient process. It costs the store a lot of money to have an employee assist in the return process. In addition, the process does not have much security and thieves return products that are damaged or that they did not pay for. Some companies have implemented ideas like Quick Response ("QR") codes to help speed up the process. However, this process is still expensive since an employee is still needed to assist in the return process.

SUMMARY

The present disclosure concerns implementing systems and methods for returning an item. The methods comprise: performing item return operations by a computing device using at least one of machine learned information about a person who purchased the item, machine learned information about a person returning the item, and machined learned information about a condition of the item at the time of sale and/or at the time of return; and automatively sorting the item using a conveyer system to move the item from a counter to a respective storage area of a plurality of storage areas assigned to different product types.

In some scenarios, the methods also comprise: learning features and characteristics of counterfeit items which are not consistent with features and characteristics of corresponding non-counterfeit items; determining if the item is a counterfeit item based on the learned features and characteristics of counterfeit items; allowing return of the item if it is determined that the item is not a counterfeit item; and denying the return of the item if it is determined that the item is a counterfeit item.

In those or other scenarios, the methods further comprise verifying that the item's return is authorized by (A) determining if a credit card number, token or code obtained from a user matches that used to purchase the item, or (B) determining if a person shown in an image captured by a camera located by a return station matches a person shown in an image captured during a purchase transaction for the item. Imaging and scanning operations may also be performed to determine item related information comprising at least one of a brand of the item, a product type for the item, a size of the item, a color of the item, an authentication mark made on the item, a weight of the item, and a code associated with the item. A validation can be made that the item being returned is a previously purchased item based on the item related information. A validation can also or alternatively be made that the item is not associated with a previous return attempt based on the item related information.

In those or other scenarios, the condition of the item is determined based on contents of an image captured while the item is being returned. The item's condition is then used to determine if it can be resold and/or if it was the same or different at a time of its purchase.

BRIEF DESCRIPTION OF THE DRAWINGS

The present solution will be described with reference to the following drawing figures, in which like numerals represent like items throughout the figures.

DETAILED DESCRIPTION

Figure 1:
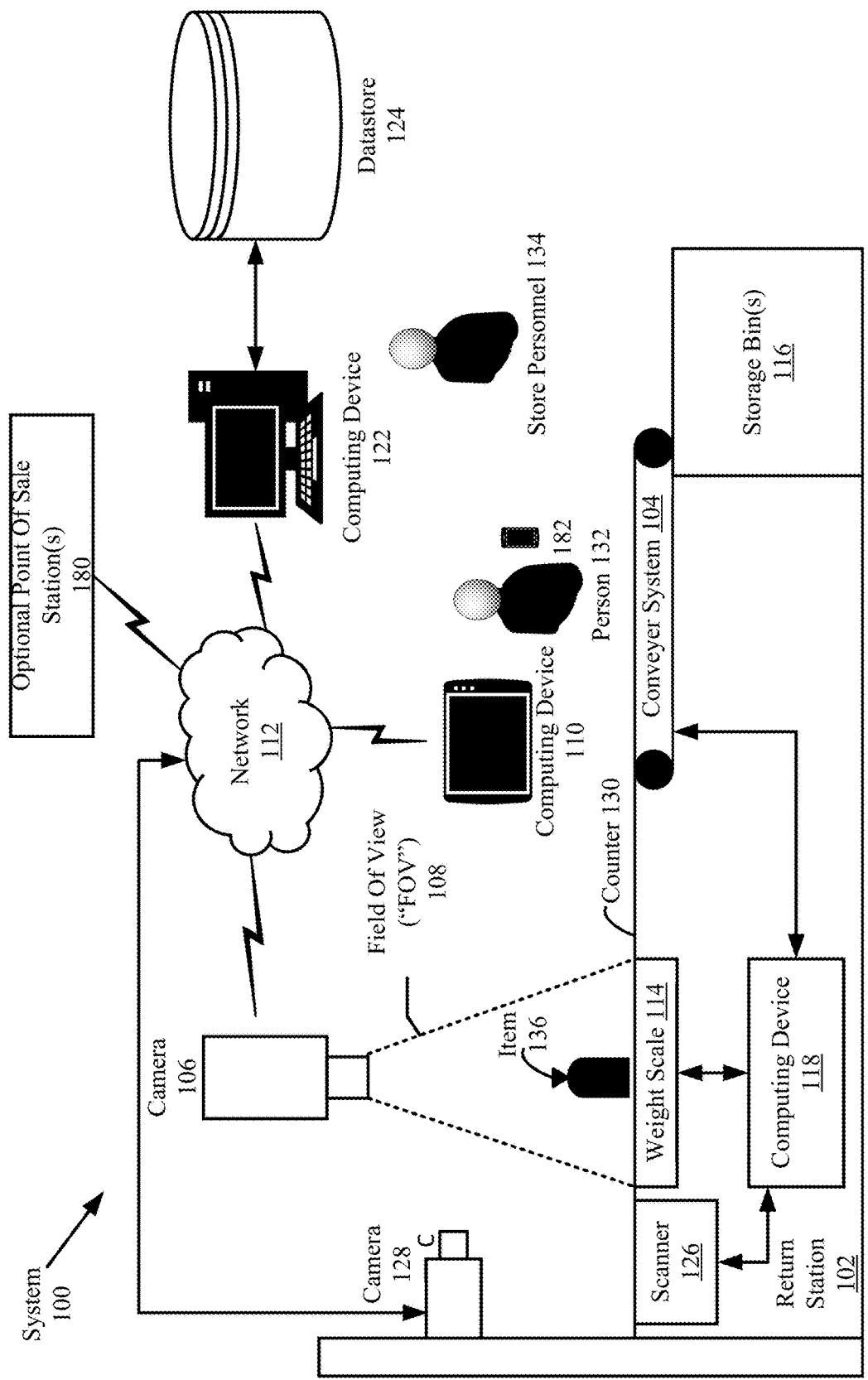
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In retail stores, there is a need for a way to return purchased items without a requirement for store employee assistance. Accordingly, the present solution provides an automated way for items to be returned to retail stores or other business entities (e.g., libraries). Multiple systems are used to speed up the return process and to verify the authenticity and quality of the returned products. These systems comprise cameras. Cameras have improved in quality and price over the years. In addition, AI and machine learning allow cameras to: identify a person, receipt, and/or credit card; determine the state or condition of a product being returned; and/or determine the authenticity of the product being returned. Furthermore, the cost of storing data associated with past purchases and about the sold products allow companies to store data that can be used to verify the validity of the return products.

The present solution will now be described in relation to the return of purchased items. The present solution is not limited in this regard. The present solution can also be used in loaned or borrowed item applications.

Referring now to FIG. 1, there is provided an illustration of an illustrative system 100. System 100 is generally configured to facilitate the purchase of items and/or the return of purchased items 136. The items include perishable items (e.g., food) and/or non-perishable items (e.g., apparel, appliances, automotive parts, beauty supplies, personal care items, books, consumer electronics, entertainment tickets, fashion accessories, footwear, office supplies, sports equipment, toys, video games, watches, glasses and/or jewelry).

As shown in FIG. 1, system 100 comprises one or more optional Point Of Sale ("POS") stations. POS stations are well known in the art, and therefore will not be described herein. Any known or to be known POS station can be used herein without limitation. The POS station includes a fixed POS station (e.g., a traditional checkout counter), a self-checkout kiosk, or a mobile POS (e.g., a smart phone). The POS station(s) is(are) generally configured to facilitate the initiation of a purchase transaction and the completion of the same. In some scenarios, a conventional POS station is modified to implement machine learning technology. For example, hardware and/or software is provided with a POS station that is configured to learn features/characteristics of a purchaser, learn patterns of movement of the purchaser, and/or learn features/characteristics/conditions of a purchased item. The learned information is stored in a datastore 124 for later use in an item return process. Datastore 124 can include, but is not limited to, a database.

System 100 also comprises a return station 102, cameras 106, 128, and computing devices 110, 122 communicatively coupled to each other via a network 112 (e.g., the Internet). Cameras are well known in the art, and therefore will not be described herein. Any known or to be known camera can be used herein without limitation. For example, in some scenarios, 3D cameras are employed. The cameras are generally configured to capture images and/or videos of scenes in their Field Of Views ("FOVs"). The term "Field Of View" or "FOV", as used herein, refers to the extent of the observable world that is captured at any given moment by a camera. Each FOV has a value less than or equal to one hundred eighty degrees (180°).

Camera 128 is placed at a location relative to the return station 102 that is suitable for capturing images and/or videos of people 132 trying to return items 136. Camera 128 is provided to assist in verifying that the same person who purchased the item is the same person who is returning the item. In this regard, the camera 128 employs algorithms to identify a person in its FOV and extract features of the identified person. The extracted features are compared against features shown in an image captured at the time of a respective purchase transaction performed by the POS station 180. If a match exists, then a verification is made that the person is the same person who purchased the item. If a match does not exist, then a flag can be set and/or store personnel can be notified. Additionally or alternatively, the image of the different person captured at the time of return can be stored in a datastore 124 so as to be associated with a user account, the respective purchase transaction and/or the item return attempt.

Camera 106 is positioned above the return station 102 so that at least a portion of a counter 130 is in its FOV 108. Camera 106 is provided to assist in identifying items being returned and/or in determining the conditions of the items being returned. In this regard, the camera 106 employs algorithms to determine what the item(s) is(are) on the counter 130 (and in some scenarios on the weight scale 114 which is optional). For example, the camera 106 is able to identify an object in an image captured thereby, determine characteristics of the object (e.g., color, size, shape, etc.), and determine a condition of the object (e.g., damaged or resalable). The characteristics are then compared against a database of object-related data to determine if a match or a similarity exits therebetween. If a match or similarity exits, then the object unique identifier associated with the matching or similar stored object-related data is allocated to the image. The condition is also compared against a condition for the item shown in an image captured at the time of its purchase. If a match does not exist, then a flag can be set that the item may not be resalable or was not sold in a damaged state as suggested by the person returning the item. Store personnel could be notified in either case.

Computing device 110 comprises a mobile computing device, such as a tablet, personal computer or smart phone. Computing device 110 is used by a person 132 to initiate an item return process, input information into system 100 during the item return process, and complete the item return process. Accordingly, computing device 110 wirelessly communicates with an enterprise system 122, 124 via the network 112 for accessing purchase transaction information generated by the POS station 180 and notifying store personnel 134 of the item return process's status. The enterprise system comprises a computing device 122 (e.g., a server) and a datastore 124. The purchase transaction information includes, but is not limited to, identifiers for purchased items, dates/times of successful purchases, payment information, biometric data for the people who made the purchases, voices of the people who made the purchases, images of people who made the purchases, and/or videos of the purchase transaction. The particulars of the item return process will become more evident as the discussion progresses.

The return station 102 comprises a counter 130 with a scanner 126, a weight scale 114 and a conveyer system 104 disposed therein so as to be accessible for use during the item return process. The scanner can include, but is not limited to, a barcode scanner, an RFID tag scanner, or other Short Range Communication ("SRC") enabled device (e.g., a Bluetooth enabled device). The scanner is provided to acquire at least one code from the item 136 being returned. The code can include, but is not limited to, a Stock Keeping Unit ("SKU") and/or a Unique Product Code ("UPC"). SKUs and UPCs are well known in the art, and therefore will not be described herein. The weight scale 114 is configured to measure the weight of an item 136 placed thereon. Barcode scanners, RFID tag scanners, and weight scales are well known in the art, and therefore will not be described herein. Any known or to be known barcode scanner, RFID tag scanner, and/or weight scale can be used herein without limitation. Information generated by or obtained by components 114, 126 is provided to a computing device 118 internal to the return station 102. Computing device 118 is communicatively coupled to computing device 110 and the enterprise system 122, 124 as well via network (although not shown in FIG. 1). Therefore, the information generated by or obtained by components 114, 126 can be provided from computing device 118 to computing device 110, 122 for processing.

Computing device 118 is also configured to control operations of the scanner 126, weight scale 114 and/or the conveyer system 104. Conveyer systems are well known in the art, and therefore will not be described in detail herein. Still, it should be understood that the conveyer system 104 comprises mechanical handling equipment for moving items from the return counter 118 to storage bin(s) 116. With the assistance of computing device 118, the items are directed to respective ones of the storage bins 116 based on their product type. For example, a book is directed to a first storage bin, while shampoo is directed to a second different storage bin. The storage bin(s) 116 provide(s) a means for storing return items until the store employee 134 is ready to replace them on a store floor for resale. This ability to automatively organize returned items by type greatly improves a subsequent process for placing returned items back on a store floor. In this regard, it should be understood that in conventional systems returned items are typically placed in a single bin at the return station. As such, prior to replacement of the same on a store floor, store personal must sort the items in accordance with a store floor layout (e.g., all toiletry items are sorted into a first pile, while home goods are sorted into a second pile) and/or conditions of the same (e.g., damaged items are sorted into a third pile). In contrast, no such manual storing is required by the present solution. Accordingly, the present solution provides a more cost effective and efficient process for placing returned item back in a store floor.

The present solution employs machine learning techniques for various purposes. The machine learning techniques can be implemented by the POS station(s) 180 and/or computing devices 110, 118, 122. For example, a machine learning algorithm is used to learn features and characteristics of counterfeit items. Images of the real or original items captured by a camera at a checkout POS station 180 and images of the fake or counterfeit items captured by camera 106 at the return station 102 can be used here to detect and learn features and/or characteristics thereof which are not consistent with those of the corresponding original or real non-counterfeit item. The features and/or characteristics can include, but are not limited to, stitching, label placement, label orientation, coloration, texturing, material, and misspelling of brand names. Detection of fake or counterfeit items has traditionally been quite difficult and required the assistance of experts. The machine learning aspect of the present solution provides an improved item return process since (A) it eliminates the need for experts while still ensuring that counterfeit items will not be accepted for return (as has been the case in some scenarios when store personnel manually handles item returns) and (B) continuously learns new features of counterfeit items so as to ensure real time updates are made in system 100 for learned counterfeit item features/characteristics. Machine learning algorithms are well known in the art, and therefore will not be described herein. Any known or to be known machine learning algorithm can be used herein without limitation. For example, supervised machine learning algorithm(s), unsupervised machine learning algorithm(s) and/or semi-supervised machine learning algorithm(s) are employed by system 100.

The present solution is not limited to the architecture shown in FIG. 1. In this regard, it should be understood that system 100 can include more or less components than that shown in FIG. 1. For example, in some scenarios, system 100 also comprises a printer for generating paper receipts.

Figure 2:
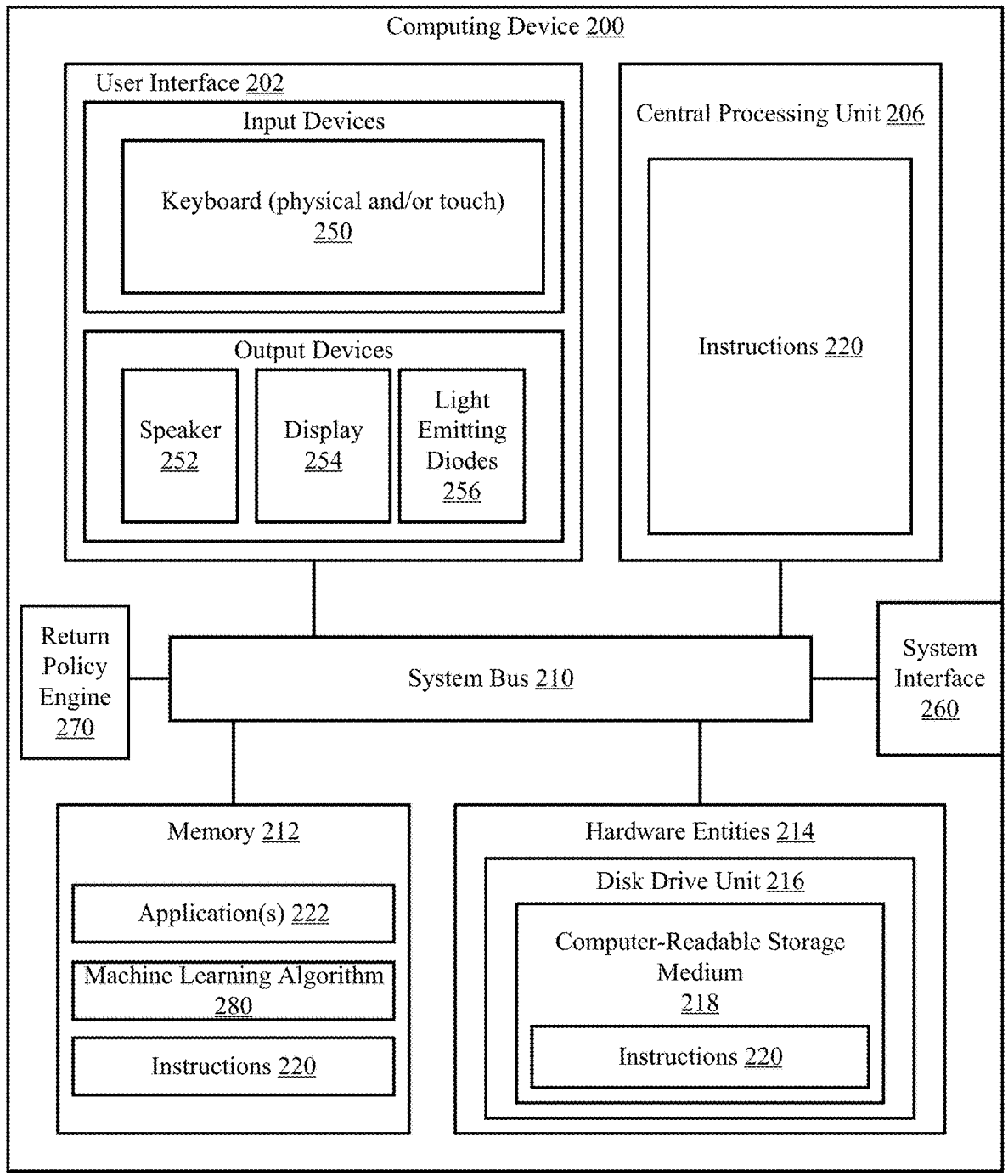
FIG. 2 is an illustration of an illustrative computing device.

Referring now to FIG. 2, there is provided an illustration of an illustrative architecture for a computing device 200. Computing device 110, 118, 122 of FIG. 1 is(are) the same as or similar to computing device 200. As such, the discussion of computing device 200 is sufficient for understanding this component of system 100.

In some scenarios, the present solution is used in a client-server architecture. Accordingly, the computing device architecture shown in FIG. 2 is sufficient for understanding the particulars of client computing devices and servers.

Computing device 200 may include more or less components than those shown in FIG. 2. However, the components shown are sufficient to disclose an illustrative solution implementing the present solution. The hardware architecture of FIG. 2 represents one implementation of a representative computing device configured to provide an improved item return process, as described herein. As such, the computing device 200 of FIG. 2 implements at least a portion of the method(s) described herein.

Some or all components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 300 through system bus 210, a system interface 260, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256. System interface 260 is configured to facilitate wired or wireless communications to and from external devices (e.g., network nodes such as access points, etc.).

At least some of the hardware entities 214 perform actions involving access to and use of memory 212, which can be a Radom Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Computing device 200 implements machine learning technology. In this regard, computing device 200 runs one or more software applications 222 for facilitating the return of items. The software algorithms 222 use machine learning algorithms 280 to learn characteristics of people associated with purchase transactions and/or credit cards used for payment during the purchase transactions, learn conditions of items at the time of purchase, learn characteristics of original real non-counterfeit items, learn characteristics or traits of counterfeit items, learn characteristic of times at the time of return, and/or learn suspicious conduct indicating that a person is trying to return items which have not been purchased or which are counterfeit. This learned information can be used for various purposes as described herein. For example, an image of a person returning an item can be captured and processed to extract features of the person. The extracted features are compared to learned features of a person associated with the purchase transaction for the item and/or credit card used to purchase the item. The learned features were obtained using sensor data obtained during the purchase transaction (e.g., captured images). Alternatively or additionally, the authenticity of an item being returned can be determined based on the learned characteristics of original real non-counterfeit items and/or the learned characteristics or traits of counterfeit items. Also, return abuses (e.g., free renting) are detected using learned conditions of an item at the time of purchase and at the time of return. The present solution is not limited to the particulars of this example.

Referring now to FIG. 3, there is provided a flow diagram of an illustrative method 300 for returning an item which had been purchased using a POS station (e.g., POS station 180 of FIG. 1). As shown in FIG. 3, method 300 comprises a plurality of operations 301-384. Method 300 can include more or less operations than that shown in accordance with a given application. Also, the present solution is not limited to the particular order of the operations shown in FIG. 3. In this regard, it should be understood that some or all of the operations can be performed in the same or different order than that shown.

Figure 3A:
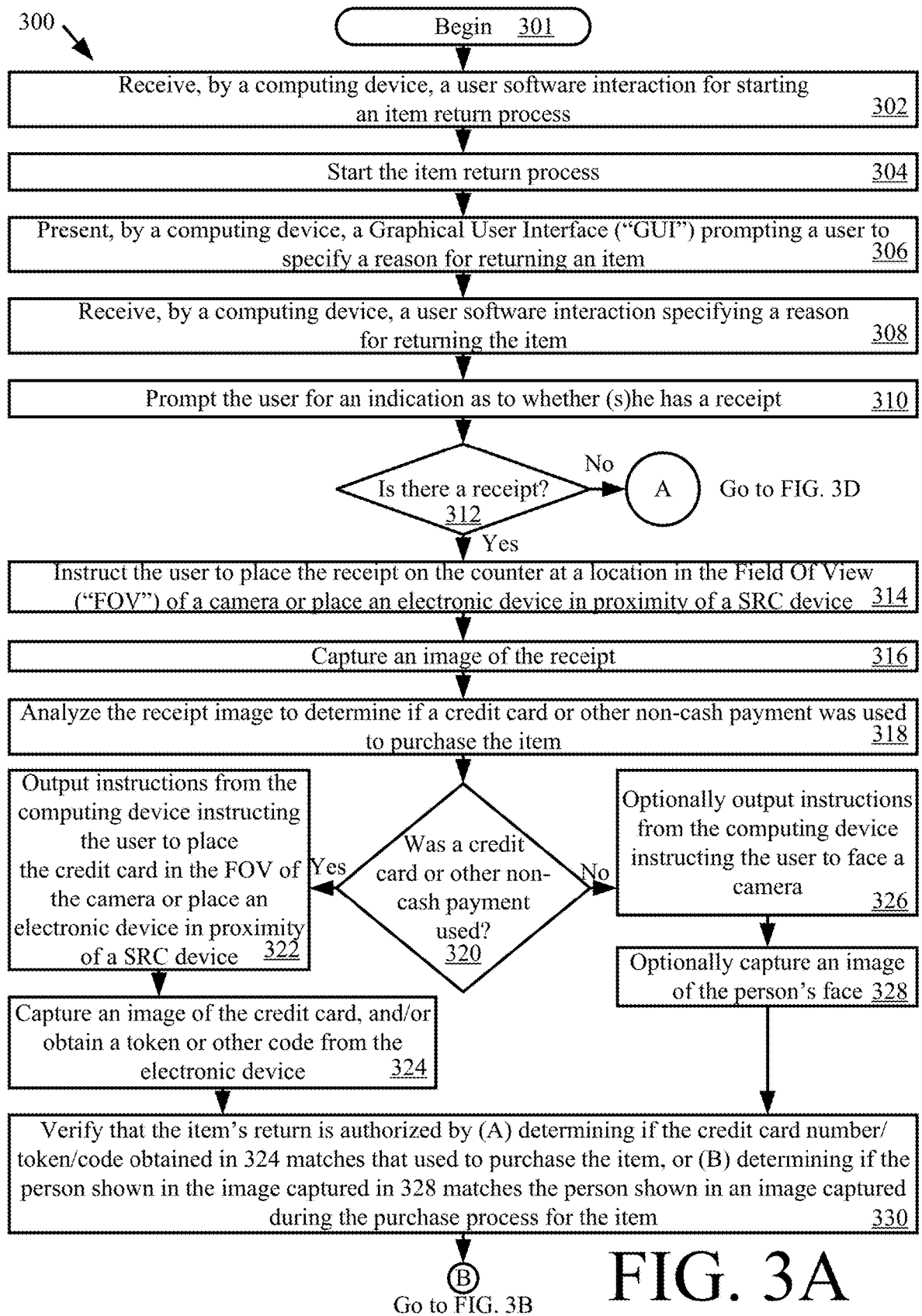
FIGS. 3A-3D (collectively referred to as "FIG. 3") provide a flow diagram of an illustration method for returning an item which was purchased.

Referring now to FIG. 3A, method 300 begins with 301 and continues with 302 where a computing device (e.g., computing device 110 of FIG. 1) receives a user software interaction for starting an item return process. This computing device can include, but is not limited to, a tablet, a smart phone or other portable electronic device. A tether, chain or other linkage may be provided for securely coupling the computing device to a return station (e.g., return station 102 of FIG. 1). This secure coupling ensures that the computing device will not be stolen, accidently misplaced, or damaged due to being dropped. The user software interaction can include, but is not limited to, the selection of an item from a drop down menu or the depression of a virtual button presented on a display (e.g., display 254 of FIG. 2) of the computing device. In response to the user-software interaction, the item return process is started in 304.

In 306, a Graphical User Interface ("GUI") is presented to the user of the computing device. By way of the GUI, the user is prompted to specify a reason for returning an item (e.g., item 136 of FIG. 1). The reasons can include, but are not limited to, defective, damaged, improper fit, wrong item, changed mind about item, and/or item arrived too late. In 308, a user software interaction is performed to specify the reason for returning the item. The user software interaction can include, but is not limited to, entering text into a text box, selecting a reason from a list of reasons, selecting a box on the GUI, depressing a virtual button of the GUI, or using any other widget.

Next in 310, the user (e.g., person 132 of FIG. 1) is prompted for an indication as to whether (s)he has a receipt. The receipt can be a hardcopy (or printed) receipt or an electronic receipt. In response to this prompt, the user performs a user-software interaction for indicating that (s)he has a receipt. The user-software interaction can include, but is not limited to, entering text in a text box, selecting a box on the GUI, depressing a virtual button of the GUI, or using any other widget.

Figure 3B:
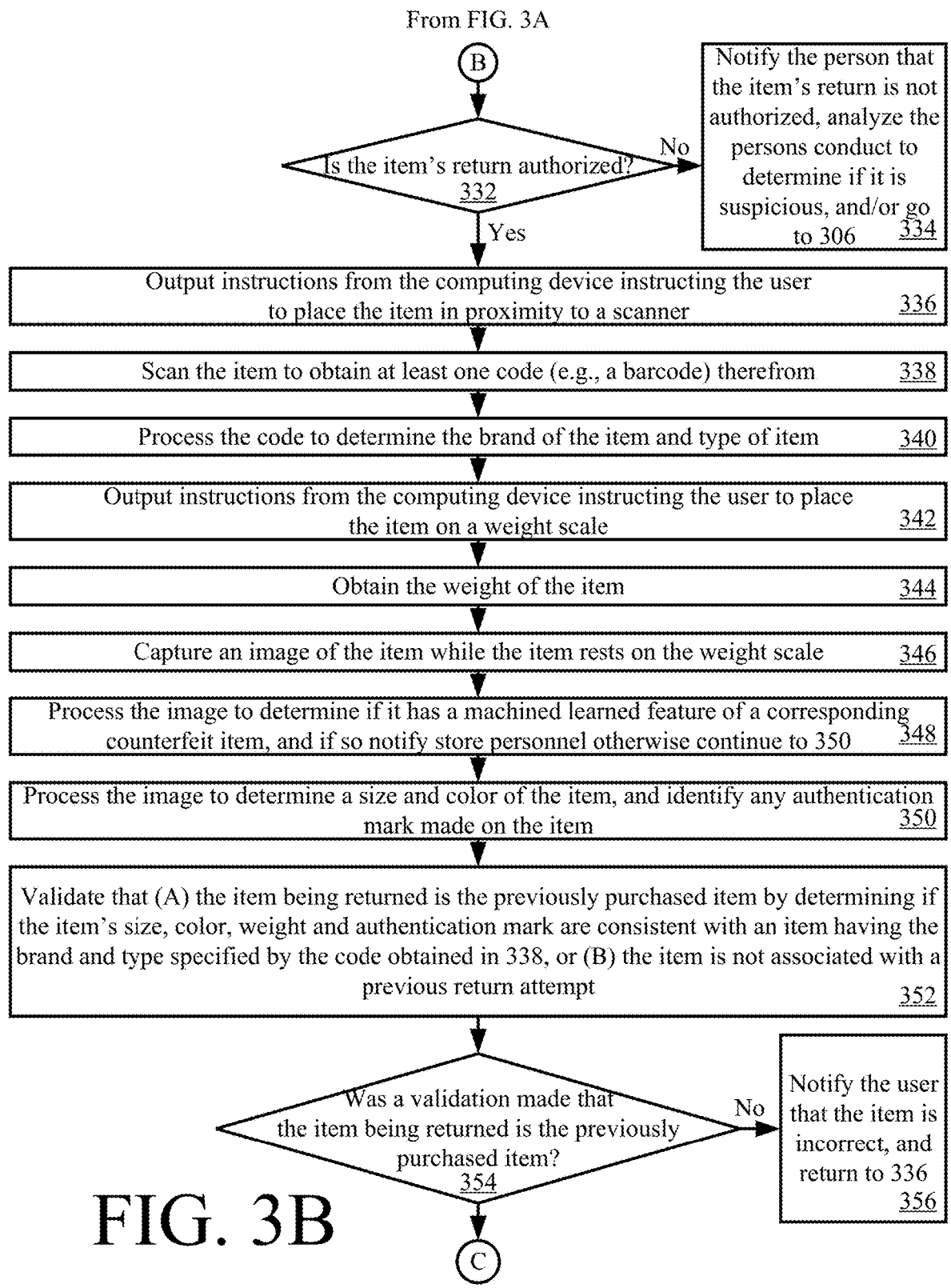
Figure 3C:
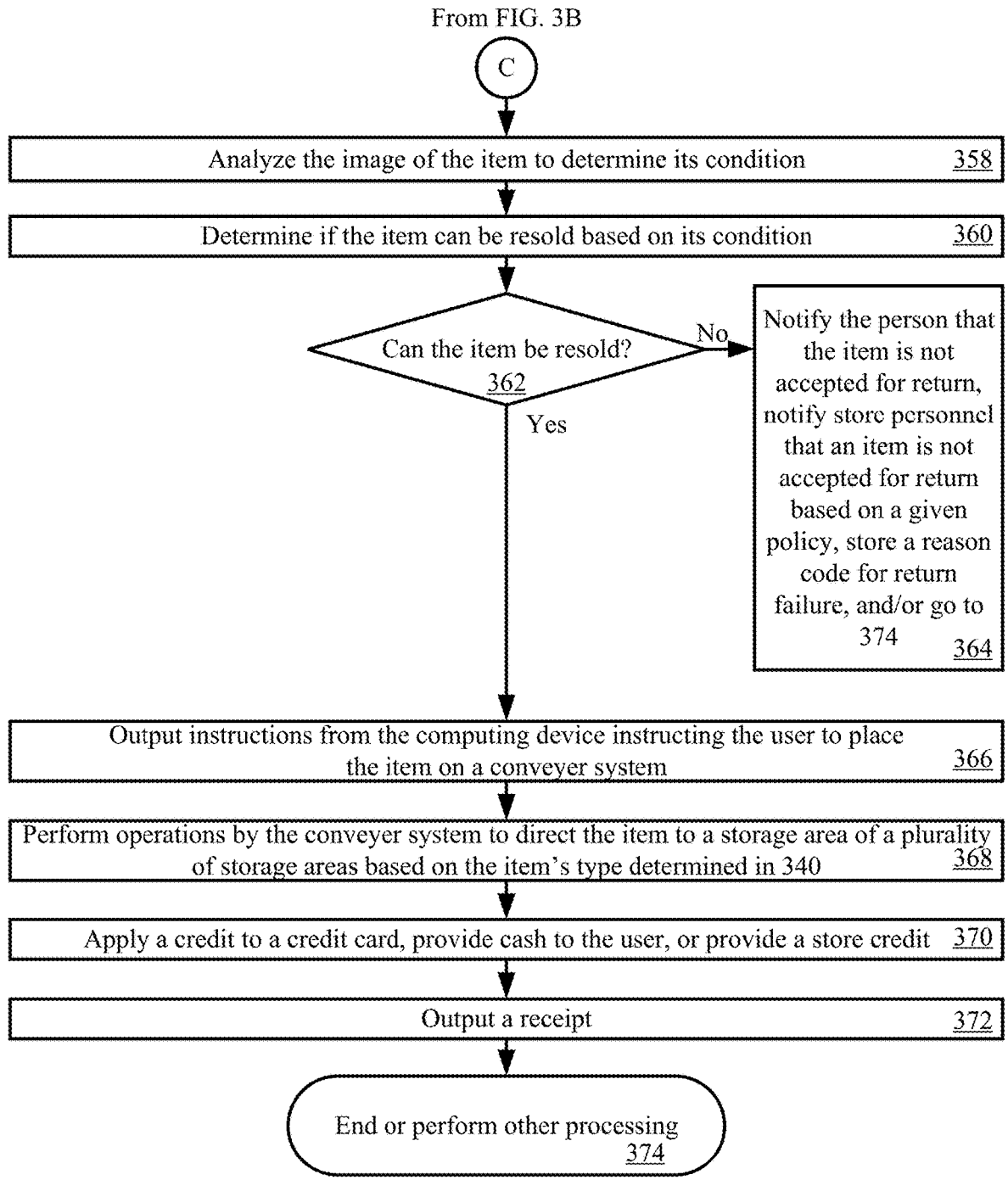
Figure 3D:
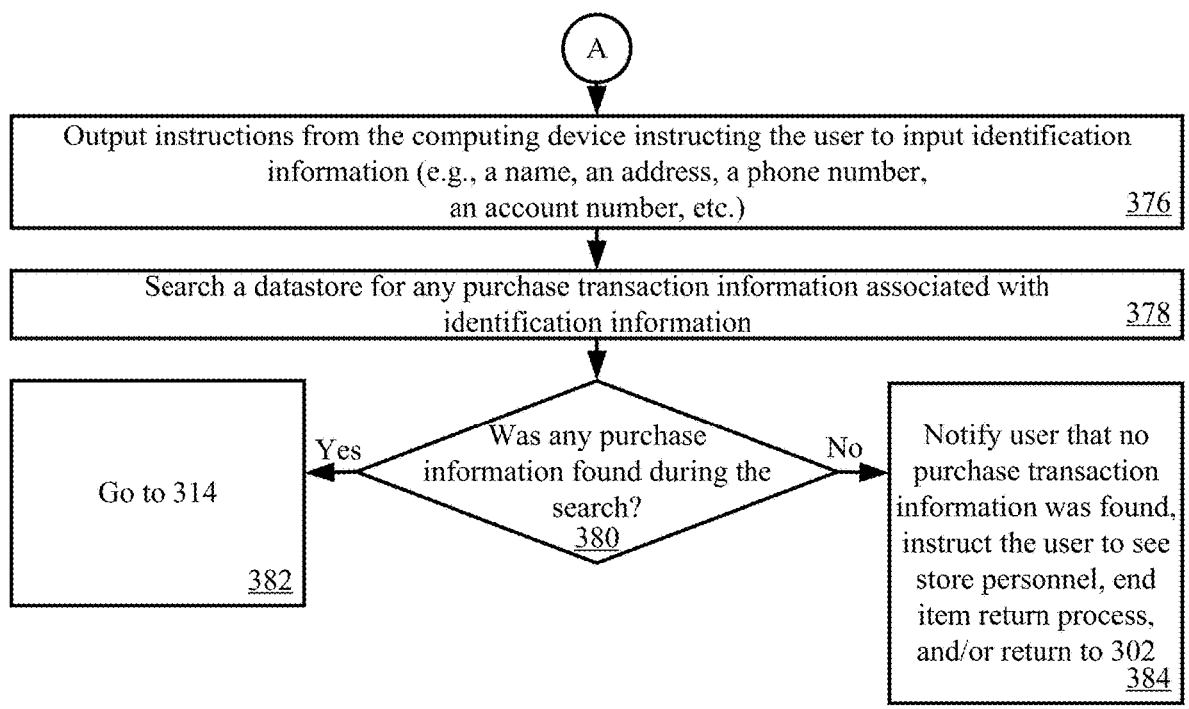

If the user does not have a receipt [312:NO], then method 300 continues with 376-378 of FIG. 3D. As shown in FIG. 3D, 376-378 involve: outputting instructions from the computing device instructing the user to input identification information (e.g., a name, an address, a phone number, an account number, etc.) into the system (e.g., system 100 of FIG. 1); and searching a datastore (e.g., datastore 124 of FIG. 1) for any purchase transaction information associated with the identification information. If purchase transaction information is not found during the search [380:NO], then 384 is performed where one or more actions is taken. These actions include, but are not limited to, notifying the user that no purchase transaction information was found, instructing the user to see store personnel, terminate the item return process, and/or return to 302 of FIG. 3A. If purchase transaction information is found during the search [380:YES], then 382 is performed where method 300 goes to 314 which will be described below.

Returning to FIG. 3A, if the user does have a receipt [312:YES], then method 300 continues with 314-318. 314-318 involve: outputting instructions from the computing device instructing the user to place the printed receipt on the counter (e.g., counter 130 of FIG. 1) at a location in the FOV of a camera (e.g., camera 106 of FIG. 1) or place a display of an electronic device (e.g., a smart phone 182 of FIG. 1) showing the electronic receipt in the FOV of the camera; capturing an image of the receipt; and analyzing the receipt image to determine if a credit card or other non-cash payment was used to purchase the item.

If a credit card or other non-cash payment was used to purchase the item [320:YES], then 322-324 are performed. 322-324 involve: outputting instructions from the computing device instructing the user to place the credit card in the FOV of the camera (e.g., camera 106 of FIG. 1); and capturing an image of the credit card. Additionally or alternatively, 322-324 involve: placing the electronic device (e.g., a smart phone 182 of FIG. 1) in proximity to an SRC device (e.g., scanner 126 of FIG. 1) of the return station (e.g., return station 102 of FIG. 1); and obtaining a token or other code from the electronic device.

If a credit card was not used [320:NO], then optional 326-328 are performed which involve: outputting instructions from the computing device instructing the user to face a camera (e.g., camera 128 of FIG. 1); and capturing an image of the person's face.

Upon completing 324 or 328, method 300 continues with 330. In 330, the enterprise system (e.g., system 100) verifies that the item's return is authorized by (A) determining if the credit card number, token or code obtained in 324 matches that used to purchase the item or (B) determining if the person shown in the image captured in 328 matches the person shown in an image captured by a POS station (e.g., POS station 180 of FIG. 1) during the purchase transaction for the item. These determinations can be made via comparison operations performed by a remote server (e.g., computing device 122 of FIG. 1) using purchase transaction data stored in a datastore (e.g., datastore 124 of FIG. 1). The purchase transaction data can include, but is not limited to, a time, a date, a list of purchased item identifiers, a price of each purchased items, a credit card number, a token, a code, and an image of the person(s) who purchased the items.

Subsequently, method 300 continues with 332 of FIG. 3B. As shown in FIG. 3B, 332 involves determining whether authorization of the item's return has been verified. If not [332:NO], then 334 is performed where one or more actions are taken. These actions can include, but are not limited to, notifying the person that the item's return is not authorized, analyzing the person's conduct to determine if it is suspicious based on machine learned patterns of suspicious conduct/movements and/or machined learned normal movement patterns for the person, and/or return to 306. Suspicious conduct can be detected by capturing a video of the person while (s)he is attempting to return the item, analyzing the video to detect a motion pattern specifying the person's movements, comparing the motion pattern to the machined learned patterns of suspicious conduct/movements, and/or comparing the motion pattern to the machined learned normal movement patterns for the person. If a match exists between the motion pattern and at least one of the machined learned patterns of suspicious conduct/movements, then suspicious conduct is detected. Otherwise suspicious conduct is not detected. If a match exists between the motion pattern and the machined learned normal movement patterns for the person, then suspicious conduct is not detected. Otherwise suspicious conduct is detected.

If the item's return is authorized [332:YES], then 336 is performed where instructions are output from the computing device instructing the user to place the item in proximity to a scanner (e.g., scanner 126 of FIG. 1). In 338, the item is scanned to obtain at least one code therefrom. The code can include, but is not limited to, a barcode, a SKU and/or a UPC. The code is processed in 340 to determine the brand of the item and the type of item.

Next in 342, instructions are output from the computing device (e.g., computing device 110 of FIG. 1) instructing the user to place the item (e.g., item 136 of FIG. 1) on a weight scale (e.g., weight scale 114 of FIG. 1). The weight scale then measures the weight of the item in 344. The measured weight can be passed to an internal computing device (e.g., computing device 118 of FIG. 1) of the return station 102 for storage and/or processing. The measured weight can be stored locally in a memory (e.g., memory 212 of FIG. 2) and/or remotely in a datastore (e.g., datatore 124 of FIG. 1).

In 346, an image of the item is captured by a camera (e.g., camera 106 of FIG. 1) while the item rests on the weight scale. The camera can include, but is not limited to, a 3D camera such that the item's height is obtained in addition to its length and width. The captured image is processed in 348 to determine if it has a machined learned feature of a corresponding counterfeit item. This determination can be made by extracting features of the item from the captured image, and comparing the extracted features to machined learned features of one or more counterfeit items. If a match exits between the extracted features and the machined learned features, store personnel is notified. If a match does not exist between the extracted features and the machined learned features, method 300 continues with 350.

350 involves processing the image to determine a size and color of the item, as well as identify any authentication mark made on the item. Next, operations are performed in 352 to validate that the item being returned is the previously purchased item. This validation is made by determining (A) if the item's size, color, weight and authentication mark are consistent with an item having the brand and type specified by the code obtained in 338, or (B) if the item is not associated with a previous return attempt. Determination (B) can be made based on result from comparing the code obtained in 338 to a code acquired in a previous return attempt. If a match exists, then it is determined that the item is associated with a previous return attempt. Otherwise, a determination is made that the item is not associated with a previous return attempt.

If a validation is not made that the item being returned is the previously purchased item [354:NO], then 356 is performed where one or more actions are taken. These actions can include, but are not limited to, notifying the user that the item is incorrect, and/or returning to 336.

If a validation is made that the item being returned is the previously purchased item [354:YES], then method 300 continues with 358 of FIG. 3C. As shown in FIG. 3C, 358 involves analyzing the image of the item to determine its condition. A determination is then made in 360 as to whether or not the item can be resold based on its condition. For example, a item can be resold if it is not damages and/or if its condition is the same as that at the time of purchase. If the item cannot be resold [362:NO], then 364 is performed where one or more actions is taken. These actions can include, but are not limited to, notifying the person (e.g., person 132 of FIG. 1) that the item is not accepted for return, notifying store personnel (e.g., store personnel 134 of FIG. 1) that an item is not accepted for return based on a given policy, store a reason code for the return failure, and/or go to 374 which will be described below.

If the item can be resold [362:YES], then 366-372 are performed. 366-372 involve: outputting instructions from the computing device (e.g., computing device 110 of FIG. 1) instructing the user (e.g., person 132 of FIG. 1) to place the item (e.g., item 136 of FIG. 1) on a conveyer system (e.g., conveyer system 104 of FIG. 1); performing operations by the conveyer system to direct the item to a storage area of a plurality of storage areas (e.g., storage bins 116 of FIG. 1) based on the item's type determined in previous 340; outputting a receipt. The receipt can be a printed receipt or an electronic receipt. Subsequently, 374 is performed where method 300 ends or other processing is performed.

The present solution can be used in various applications. In some scenarios, an image of the purchaser and/or associated metadata are recorded when an item is purchased.

This image and metadata can be used to authenticate the person when (s)he returns the item to the store. This authentication is useful when the receipt is lost.

In other scenarios, an image of the purchaser and/or associated metadata are recorded when an item is purchased. Also, machine learning operations are performed to (A) determine the state or condition of the item at the time of purchase and (B) determine the state or condition of the item at the time of return. The state/condition of (B) is compared to the state/condition of (A) when the item is returned. This could stop cases where someone returns an item and claims that the item was damages when they bought it or cases where someone tries to return a counterfeit item that doesn't match the item they purchased.

The present solution can also be used to stop fraudulent returns. For example, the present solution could stop cases where a person takes an item of the retail floor and tries to return the item without any purchase thereof. This could save retail stores a significant amount of money in improper store credits.

In some scenarios, voice recognition is employed. System 100 would further comprise an audio microphone, a display, and an audio speaker. These additional components would be connected to the computing device 110, computing device 118 and/or the enterprise system 122, 123. AI could process the images and output questions on the display or from the audio speaker. The customer could hold his(her) credit card in from of a camera 106, 128 so that a credit card number could be read therefrom. The customer could then be prompted to input additional authenticating information such as a zip code associated with the credit card. This would allow system 100 to be implemented with simple, low cost hardware.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for returning an item, comprising:
   performing item return operations by a computing device using at least one of machine learned information about a person who purchased the item, machine learned information about a person returning the item, and machined learned information about a condition of the item at at least one of the time of sale and at the time of return;
   automatively sorting the item using a conveyer system to move the item from a counter to a respective storage area of a plurality of storage areas assigned to different product types;
   performing imaging and scanning operations to determine item related information comprising at least one of a brand of the item, a product type for the item, a size of the item, a color of the item, an authentication mark made on the item, a weight of the item, and a code associated with the item; and
   validating that the item is not associated with a previous return attempt based on the item related information.

2. The method according to claim 1, further comprising performing operations by the computing device to learn features and characteristics of counterfeit items which are not consistent with features and characteristics of corresponding non-counterfeit items.

3. The method according to claim 2, further comprising:
   determining if the item is a counterfeit item based on the learned features and characteristics of counterfeit items;
   allowing return of the item if it is determined that the item is not a counterfeit item; and
   denying the return of the item if it is determined that the item is a counterfeit item.

4. The method according to claim 1, further comprising verifying by the computing device that the item's return is authorized by (A) determining if a credit card number, token or code obtained from a user matches that used to purchase the item, or (B) determining if a person shown in an image captured by a camera located by a return station matches a person shown in an image captured during a purchase transaction for the item.

5. The method according to claim 1, further comprising validating that the item being returned is a previously purchased item based on the item related information.

6. The method according to claim 1, further comprising determining a condition of the item based on contents of an image captured while the item is being returned.

7. The method according to claim 6, further comprising determining if the item can be resold based on the determined condition.

8. The method according to claim 6, further comprising determining if the condition of the item is the same or different at a time of purchase and a time of return.

9. A system, comprising:
   a processor;
   a non-transitory computer-readable storage medium comprising programming instructions that are configured to cause the processor to implement a method for returning items in a computing device, wherein the programming instructions comprise instructions to:
      perform item return operations using at least one of machine learned information about a person who purchased the item, machine learned information about a person returning the item, and machined learned information about a condition of the item at at least one of the time of sale and at the time of return;
      a conveyer system configured to automatively sort the item using a conveyer system to move the item from a counter to a respective storage area of a plurality of storage areas assigned to different product types;
      perform imaging and scanning operations to determine item related information comprising at least one of a brand of the item, a product type for the item, a size of the item, a color of the item, an authentication mark made on the item, a weight of the item, and a code associated with the item; and
      validate that the item is not associated with a previous return attempt based on the item related information.

10. The system according to claim 9, wherein the programming instructions further comprise instructions to learn features and characteristics of counterfeit items which are not consistent with features and characteristics of corresponding non-counterfeit items.

11. The system according to claim 10, wherein the programming instructions further comprise instructions to:
   determine if the item is a counterfeit item based on the learned features and characteristics of counterfeit items;
   allow return of the item if it is determined that the item is not a counterfeit item; and deny the return of the item if it is determined that the item is a counterfeit item.

12. The system according to claim 9, wherein the programming instructions further comprise instructions to verify that the item's return is authorized by (A) determining if a credit card number, token or code obtained from a user matches that used to purchase the item, or (B) determine if a person shown in an image captured by a camera located by a return station matches a person shown in an image captured during a purchase transaction for the item.

13. The system according to claim 9, wherein the programming instructions further comprise instructions to validate that the item being returned is a previously purchased item based on the item related information.

14. The system according to claim 9, wherein the programming instructions further comprise instructions to determine a condition of the item based on contents of an image captured while the item is being returned.

15. The system according to claim 14, wherein the programming instructions further comprise instructions to determine if the item can be resold based on the determined condition.

16. The system according to claim 14, wherein the programming instructions further comprise instructions to determine if the condition of the item is the same or different at a time of purchase and a time of return.

\* \* \* \* \*